(12) United States Patent
Azai

(10) Patent No.: US 6,478,245 B2
(45) Date of Patent: Nov. 12, 2002

(54) CLUTCH DEVICE FOR DRIVING REEL SUPPORT IN VIDEOTAPE RECORDER

(75) Inventor: Koji Azai, Takefu (JP)

(73) Assignee: Orion Electric Co., Ltd., Fukui (JP)

( * ) Notice: Subject to any disclaimer, the term of this patent is extended or adjusted under 35 U.S.C. 154(b) by 49 days.

(21) Appl. No.: 09/840,831

(22) Filed: Apr. 25, 2001

(65) Prior Publication Data
US 2001/0035471 A1 Nov. 1, 2001

(30) Foreign Application Priority Data
Apr. 26, 2000 (JP) ......................................... 2000-125324

(51) Int. Cl.[7] ................................................ G11B 15/32
(52) U.S. Cl. .................................... 242/356.3; 360/96.3
(58) Field of Search ............................. 242/356.3, 356; 360/96.3

Primary Examiner—John Q. Nguyen
(74) Attorney, Agent, or Firm—Wenderoth, Lind & Ponack, L.L.P.

(57) ABSTRACT

An improved clutch device for transmitting the motive power from an associated follower pulley to a selected reel support via an associated idler gear in a videotape recorder. It comprises a top clutch fixed to the top of the axle of the follower pulley, and a coupling gear urged by an associated coiled spring apart from the top clutch and fitted around the top clutch. The top. clutch has a plurality of nail pieces integrally connected to and descending from its circumference. Each nail piece has two ramp-shaped indents formed on its opposite sides. The coupling gear has rib pieces integrally connected to and descending from its circumference. Each rib piece has a counter ramp-shaped indent inside, thereby allowing one or the other ramp-shaped indent of each nail piece to engage with the counter ramp-shaped indent of each rib piece while the top clutch is made to descend in the annular space of the coupling gear, thus preventing further descent of said top clutch.

2 Claims, 5 Drawing Sheets

CLUTCH DEVICE FOR DRIVING REEL SUPPORT IN VIDEOTAPE RECORDER

BACKGROUND OF THE INVENTION

1. Field of the Invention

The present invention relates to a clutch device for transmitting the motive power from an associated follower pulley to a selected reel support via an associated idler gear in a videotape recorder.

2. Related Arts

In the videotape recorder rotation of the capstan motor is transmitted to the reel gear of a selected reel support via the clutch device. The primary pulley is fixed to the shaft of the capstan motor, and the follower pulley of the clutch device is connected to the primary pulley by the belt.

The videotape recorder is loaded with the magnetic tape. Specifically the magnetic tape is pulled out from the cassette to be pinched between: the pinch roll and the capstan. The videotape recorder can work in: the forward play mode in which the winding reel support is rotated to wind the magnetic tape therearound while the magnetic tape is played back; the reversal play mode in which the unwinding reel support is rotated to wind the magnetic tape therearound while the magnetic tape is played back; the fast feeding mode in which the winding reel support is rotated fast to wind the magnetic tape therearound quickly; and the rewinding mode in which the unwinding reel support is rotated fast to wind the magnetic tape therearound quickly.

Both in the forward play mode and in the reversal play mode the small clutch gear is meshed with the large idler gear, allowing the capstan motor to transmit its rotation from the follower pulley to the large idler gear via the friction type of power-transmission. In contrast with this, both in the fast feeding mode and in the rewinding mode the large clutch gear is engaged with the small idler gear, and the follower pulley is engaged directly with the clutch, thereby allowing the capstan motor to transmit its rotation from the follower pulley to the small idler gear via the large clutch gear.

Referring to FIG. 7, the small clutch gear of the coupling gear unit 1 is engaged with the large idler gear 15 when the videotape recorder is in the forward play mode. As shown in the drawing, the coupling gear unit 1 is raised by the coiled spring 16 so that the small clutch gear of the coupling gear unit 1 may be engaged with the large idler gear 15. When the videotape recorder is in the fast feeding mode or in the tape rewinding mode the coupling gear unit 1 is pushed down with an associated lever, allowing the large clutch gear to mesh the small idler gear. Thus, the reel support is rotated at an increased speed.

In the play mode and the reversal play mode the selected clutch gear of the coupling gear unit 1 is meshed with the counter idler gear 15 to transmit the rotary torque to the reel support. The gear teeth have tapered surfaces for reducing stick of teeth in mold. What with the tapered surfaces of gear teeth and what with the counter force caused by the transmitted torque the clutch and idler gears meshed together cannot be stable in position. In the worst incident the clutch and idler gears come off from each other. Even though these gears remain in their meshing condition, they are climbing up or down on each other all the time, chattering ceaselessly.

SUMMARY OF THE INVENTION

One object of the present invention is to provide an improved clutch device for transmitting the motive power from an associated follower pulley to a selected reel support via an associated idler gear in a videotape recorder, assuring that the clutch and idler gears do not come off from each other, and that these gears do not climb up or down on each other, not chattering.

To attain this object a clutch device for transmitting the motive power from an associated follower pulley to a selected reel support via an associated idler gear in a videotape recorder, is improved according to the present invention in that it comprises a top clutch fixed to the top of the axle of the follower pulley, said top clutch having a plurality of nail pieces integrally connected to and descending from its circumference, each nail piece having two ramp-shaped indents formed on its opposite sides; and a coupling gear urged by an associated coiled spring apart from the top clutch and fitted around the top clutch, said coupling gear having rib pieces integrally connected to and descending from its circumference, each rib piece having two ramp-shaped indents formed on its opposite sides, thereby allowing one or the other ramp-shaped indent of each nail piece to engage with the counter ramp-shaped indent of each rib piece while the top clutch is made to descend in the annular space of the coupling gear, thus preventing further descent of said top clutch.

The two ramp-shaped indents of each rib piece are present at different levels.

Other objects and advantages of the present invention will be understood from the following description of a clutch device according to one preferred embodiment of the present invention:

BRIEF DESCRIPTION OF THE DRAWING

FIG. 2(*b*) is a longitudinal section of the top clutch; and FIG. 2(*c*) is an enlarged view of a selected nail piece;

DETAILED DESCRIPTION OF PREFERRED EMBODIMENT

Figure 1A:
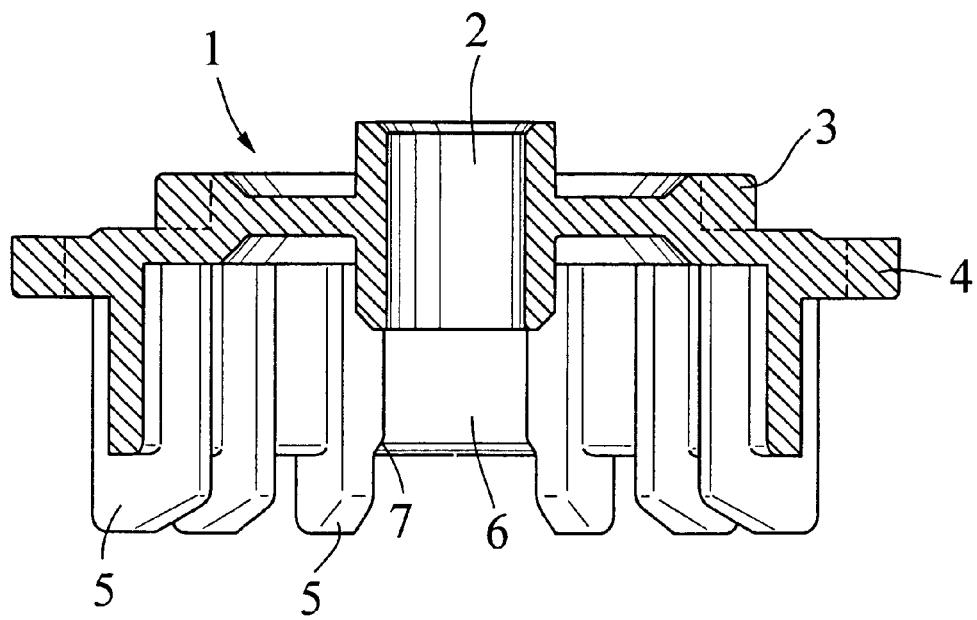
FIG. 1(*a*) is a longitudinal section of the coupling gear of a clutch device according to the present invention whereas FIG. 1(*b*) is an enlarged side view of a selected rib piece of the coupling gear.
Figure 7:
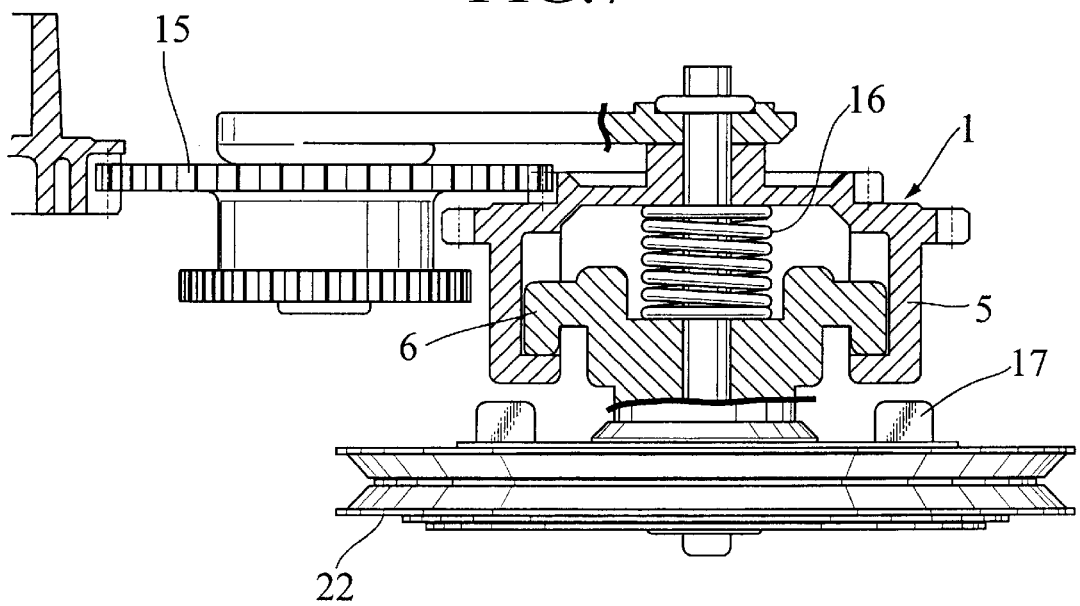
FIG. 7 illustrates how a conventional clutch is like in the play mode.

A clutch device according to the present invention comprises same essential parts as the conventional clutch device of FIG. 7. It comprises a coupling gear 1 and a top clutch 9 both operatively connected to an associated follower pulley 22. Referring to FIG. 1(*a*), the coupling gear 1 of the clutch device has a small gear 3 and a large gear 4 integrally connected together around its pivot hole 2, and the large gear 4 has a plurality of rib pieces 5 integrally connected to and depending from its circumference.

The rib pieces 5 are arranged at regular intervals to define an inter-rib space 6 between two adjacent rib pieces 5, and each rib piece 5 has a ramp-shaped indent 7 formed inside.

Figure 1B:
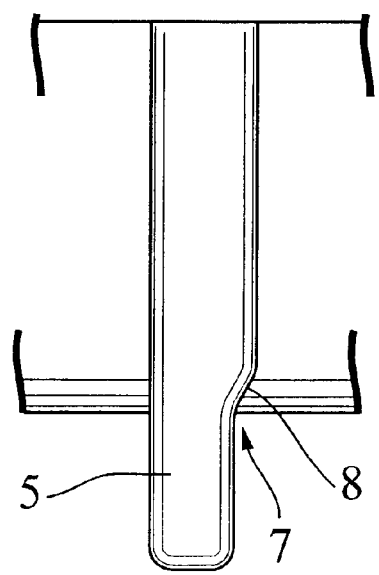

As seen from FIG. 1(b), the ramp-shaped indent 7 has a slope 8 connecting the lower, narrow section and the upper, broad section of the rib piece 5. The top clutch 9 of the clutch device has nail pieces to be caught by the ramp-shaped indents 7 of the rib pieces 5 in transmitting the torque to the idler gear, as later described in detail.

Figure 2A:
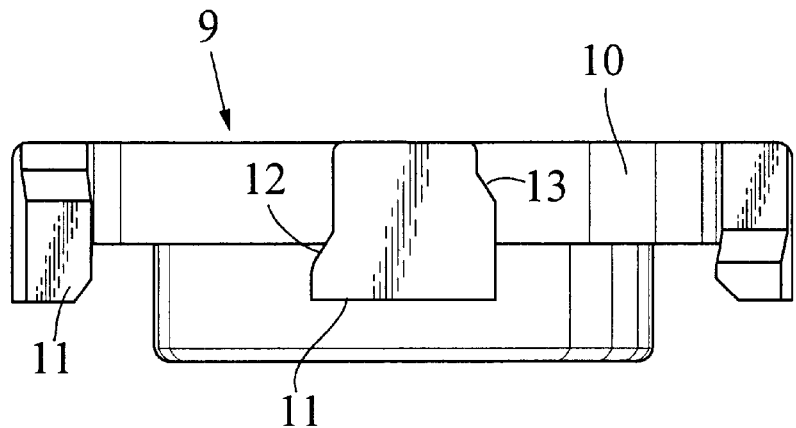
FIG. 2(*a*) is a side view of the top clutch of the clutch device;.
Figure 2B:
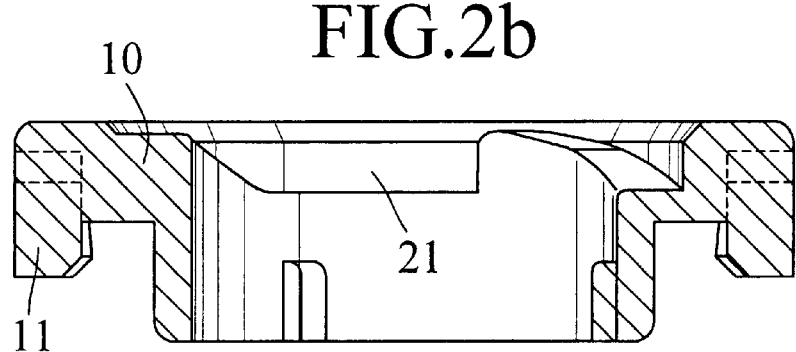
Figure 2C:
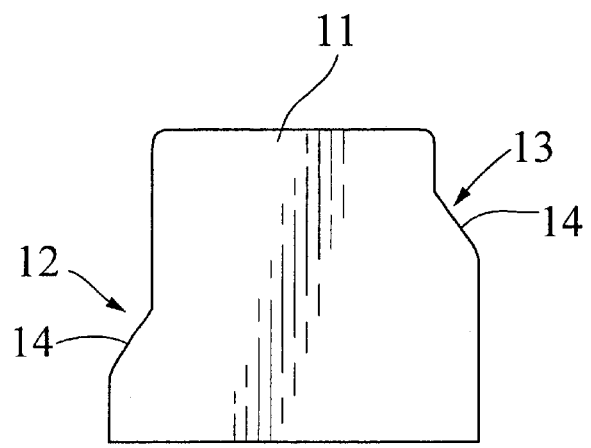

Referring to FIGS. 2(a) and 2(b), the top clutch 9 has a plurality of nail pieces 11 integrally connected to and depending from its annular body 10. As best seen from FIG. 2(c), each nail piece 11 has ramp-shaped indents 12 and 13 formed on its opposite sides. These ramp-shaped indents 12 and 13 are formed at different levels. Specifically the ramp-shaped indent 12 on the left side is at a lower level whereas the ramp-shaped indent 13 on the right side is at a higher level.

Figure 3:
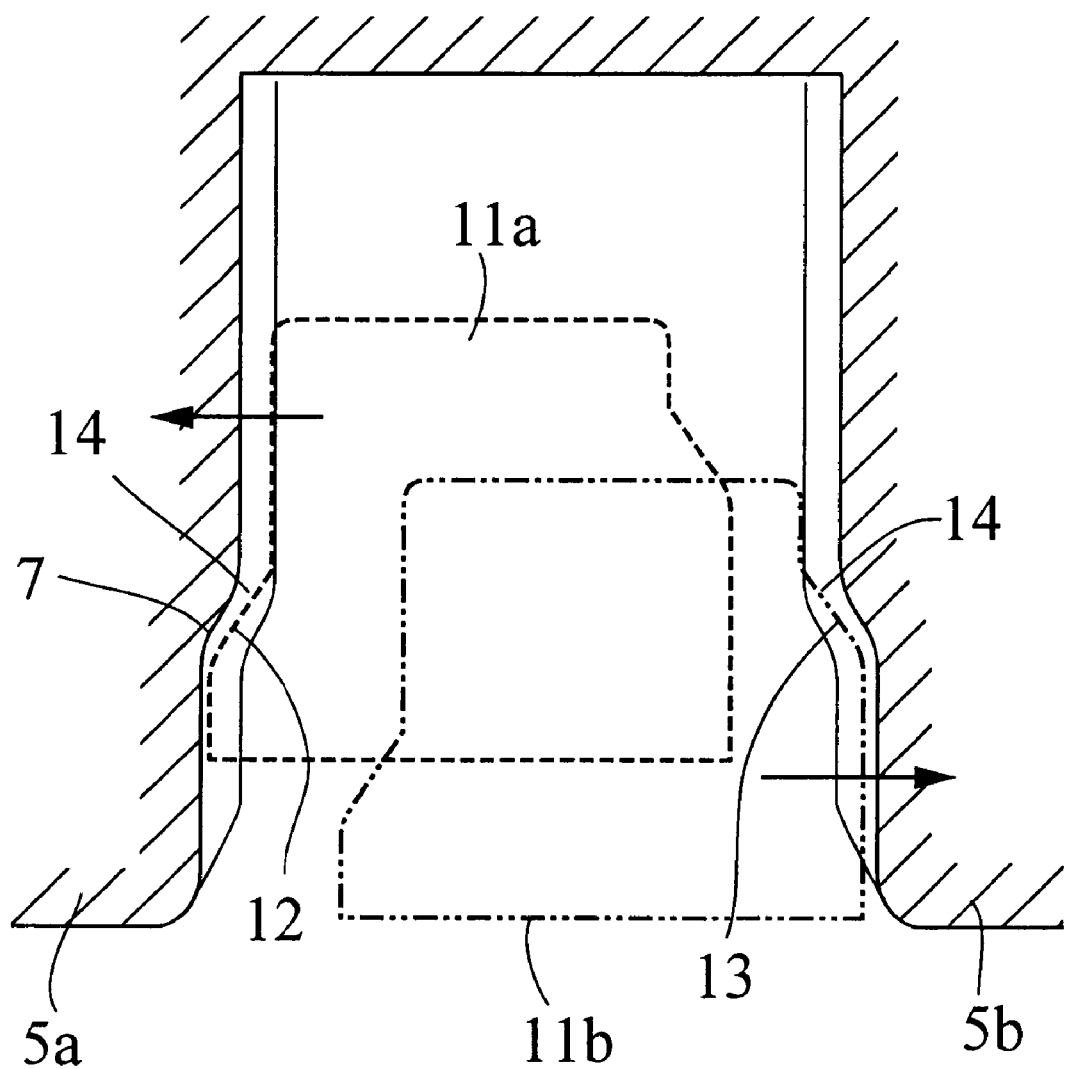
FIG. 3 illustrates how a selected nail piece of the top clutch is engaged with the rib piece of the coupling gear.

FIG. 3 illustrates how each nail piece 11 of the top clutch 9 is caught by either rib piece 5 in the inter-rib space. As the follower pulley 22 rotates, the top clutch 9 rotates leftwards (as indicated by arrow) in the forward play mode, so that the nail piece 11a may abut on the rib piece 5a with the ramp-shaped. indent 12 of the nail piece 11a engaged with the ramp-shaped indent 7 of the rib piece 5a, thus preventing the rib piece 5a of the coupling gear 1 from descending still lower.

In contrast with this, in the reversal play mode the top clutch 9 rotates rightwards (as indicated by arrow) to allow the nail piece 11b to abut on the rib piece 5b of the coupling gear 1 with the ramp-shaped indent 13 of the nail piece 11b engaged with the ramp-shaped indent 7 of the rib piece 5b, thus preventing the rib piece 5b of the coupling gear 1 from descending still lower.

Figure 4:
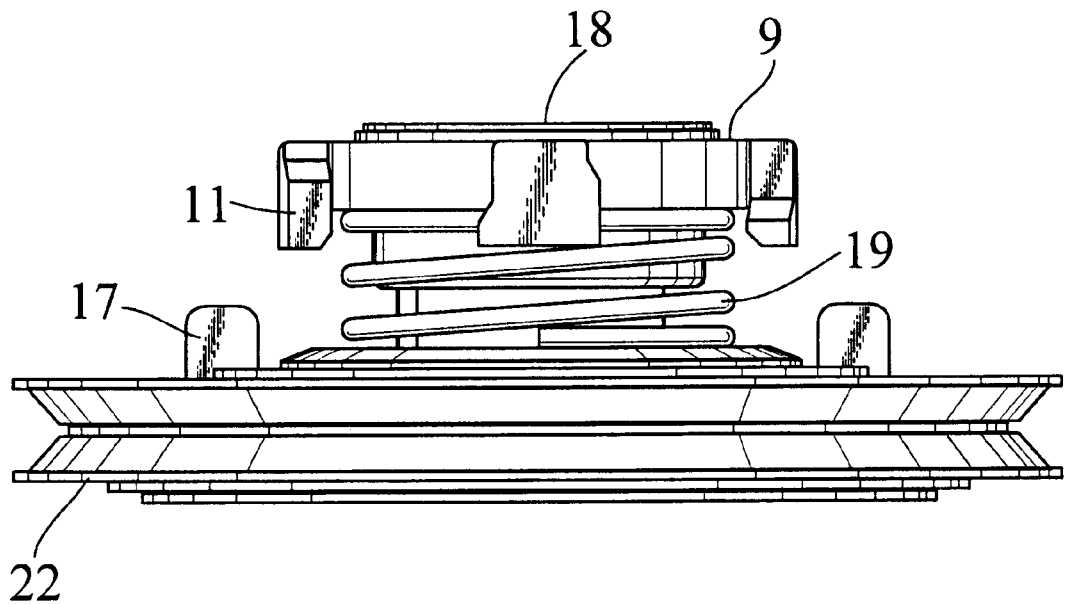
FIG. 4 illustrates how the top clutch is like in the play mode.
Figure 5:
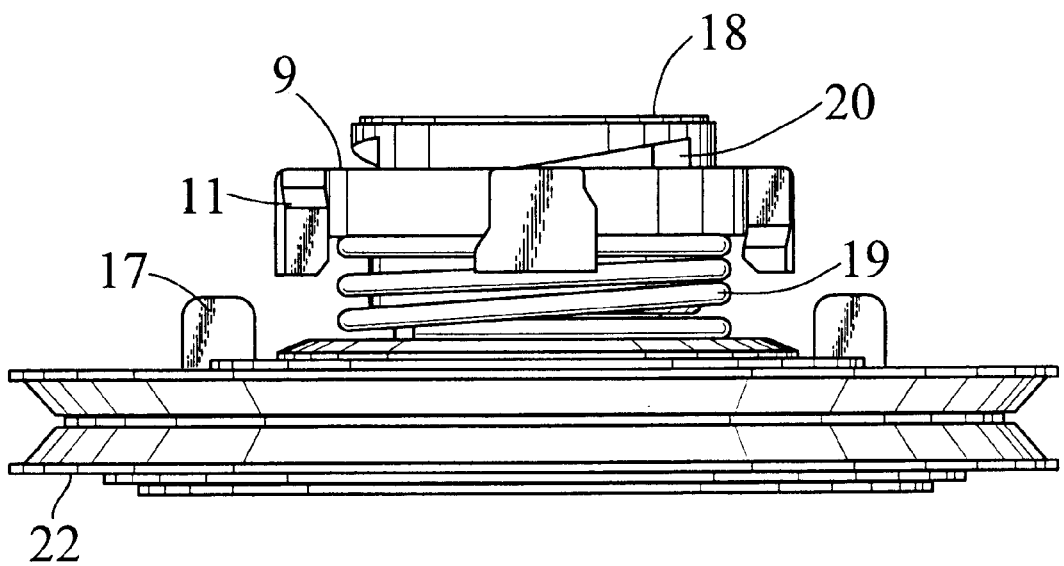
FIG. 5 illustrates how the top clutch is like in the reversal play mode.

Referring to FIG. 4, in the forward play mode the top clutch 9 is raised upwards by the coiled spring 19. Referring to FIG. 5, in the reversal play mode the cam 20 of the cam clutch 18 in the annular body 10 of the top clutch 9 is made to climb on the counter cam 21 formed inside of the annular body 10 so that the top clutch 9 may be lowered while pushing the coiled spring 19 downwards.

In the forward play mode (rotating leftwards as indicated by arrow in FIG. 3) the nail piece 11a is lowered a short distance or zero distance, thus compressing the coiled spring 19 only a short distance. In contrast with this, in the reversal play mode (rotating rightwards as indicated by arrow in FIG. 3) the nail piece 11b is lowered a long distance, thus compressing the coiled spring 19 a long distance. Accordingly the pressure applied to the friction plate, which is between the follower pulley 22 and the coiled spring 19, is increased, and accordingly the transmitted torque is increased.

Figure 6:
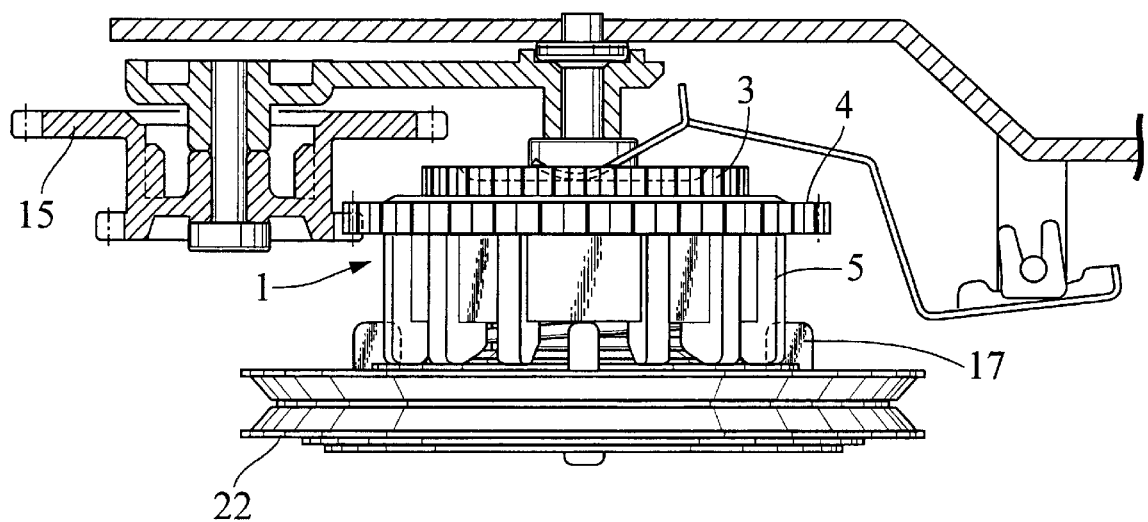
FIG. 6 illustrates how the clutch device is like in the fast feeding mode.

In the fast feeding mode or in the rewinding mode the reel support is rotated at an increased speed by transmitting rotation of the follower pulley 22 to the small idler gear via the large gear 4 of the coupling gear 1 rather than the top clutch 9. Then, the coupling gear 1 is pushed a long distance down until the rib pieces 5 of the coupling gear 1 have been caught by the rib pieces 17 rising upright from the follower pulley 22 (see FIG. 6). The rib pieces 5 of the coupling gear 1 cannot be caught by the ramp-shaped indents 12, 13 of the top clutch 9 on the way to the lowest level at which the rib pieces 5 of the coupling gear 1 are caught by the rib pieces 17 of the follower pulley 22. The ramp-shaped indents 12, 13 present the downward slopes to the descending rib pieces 5 of the coupling gear 1, and therefore, the coupling gear 1 cannot be prevented from descending to the lowest level.

As may be understood from the above, while a selected clutch gear is engaged with the counter idler gear, the so meshed clutch and idler gears cannot come off from each other or chatter because the ramp-shaped indents of the nail pieces of the top clutch mesh the ramp-shaped indents of the rib pieces of the coupling gear, thereby preventing the coupling gear from descending further. The downward slope of the ramp shape of the nail piece relative to the descending rib piece permits the coupling gear to be coupled smoothly with the follower pulley in the fast feeding or rewinding mode. The ramp-shaped indents are formed on the opposite sides of the nail piece at different levels, and therefore, the top clutch pushed down by the coupling gear through the agency of its rib pieces effectively controls the compression of the coiled spring, and hence the transmission torque, dependent on which ramp-shaped indent of the nail piece is caught by the counter ramp-shaped indent of the rib piece.

What is claimed is:

1. A clutch device for transmitting the motive power from an associated follower pulley to a selected reel support via an associated idler gear in a videotape recorder comprising: a top clutch fixed to the top of the axle of the follower pulley, said top clutch having a plurality of nail pieces integrally connected to and descending from its circumference, each nail piece having two ramp-shaped indents formed on its opposite sides; and a coupling gear urged by an associated coiled spring apart from the top clutch and fitted around the top clutch, said coupling gear having rib pieces integrally counter connected to and descending from its circumference, each rib piece having a ramp-shaped indent formed inside, thereby allowing one or the other ramp-shaped indent of each nail piece to engage with the counter ramp-shaped indent of each rib piece while the top clutch is made to descend in the annular space of the coupling gear, thus preventing further descent of said top clutch.

2. A clutch device for transmitting the motive power from an associated follower pulley to a winding or unwinding reel support via an associated idler gear in a videotape recorder according to claim 1, wherein the two ramp-shaped indents each nail piece are present at different levels.

* * * * *